United States Patent
Pechtold et al.

(10) Patent No.: US 7,736,566 B2
(45) Date of Patent: Jun. 15, 2010

(54) MANUFACTURING PROCESS FOR HYDROGEN PRESSURE TANK

(75) Inventors: Rainer Pechtold, Russelsheim (DE); Ingo Hermann, Mainz (DE); Markus Lindner, Mainz (DE)

(73) Assignee: GM Global Technology Operations, Inc., Detroit, MI (US)

( * ) Notice: Subject to any disclaimer, the term of this patent is extended or adjusted under 35 U.S.C. 154(b) by 1261 days.

(21) Appl. No.: 11/198,202

(22) Filed: Aug. 5, 2005

(65) Prior Publication Data

US 2007/0029701 A1    Feb. 8, 2007

(51) Int. Cl.
*B29C 45/14* (2006.01)
(52) U.S. Cl. .................. 264/255; 264/259; 264/299
(58) Field of Classification Search ............. 264/255, 264/310, 311, 583, 299, 259
See application file for complete search history.

(56) References Cited

U.S. PATENT DOCUMENTS 5,746,961 A * 5/1998 Stevenson et al. ........... 264/255
6,415,941 B1 * 7/2002 Huse ........................ 220/562
2005/0194714 A1 * 9/2005 Nish et al. .................. 264/255

* cited by examiner

*Primary Examiner*—Steven P Griffin
*Assistant Examiner*—Saeed M Huda
(74) *Attorney, Agent, or Firm*—John A. Miller; Miller IP Group, PLC

(57) ABSTRACT

A process for manufacturing a compressed gas tank that includes a combination of an injection molding process and a rotomolding process. In a first step, a boss to be positioned in the opening of an outer structural layer of the tank is provided and a thin portion of the liner is injection molded to the boss so that a channel within the boss is filled with the liner material to increase the seal integrity between the boss and the liner. Once the liner material is hardened, the surface of the injection molding liner portion is cleaned. Next, a rotomolding process is performed to mold the remaining portion of the liner to the boss. During the rotomolding process, the injection molded portion of the liner melts to be part of the liner made during the rotomolding process.

19 Claims, 2 Drawing Sheets

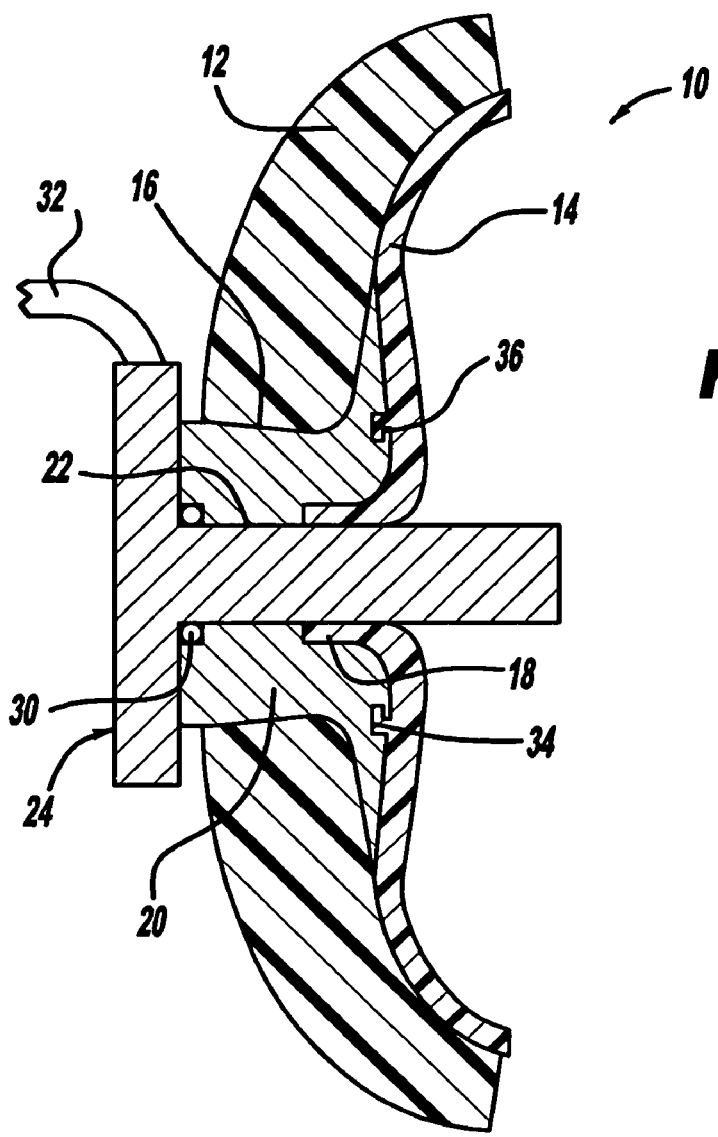
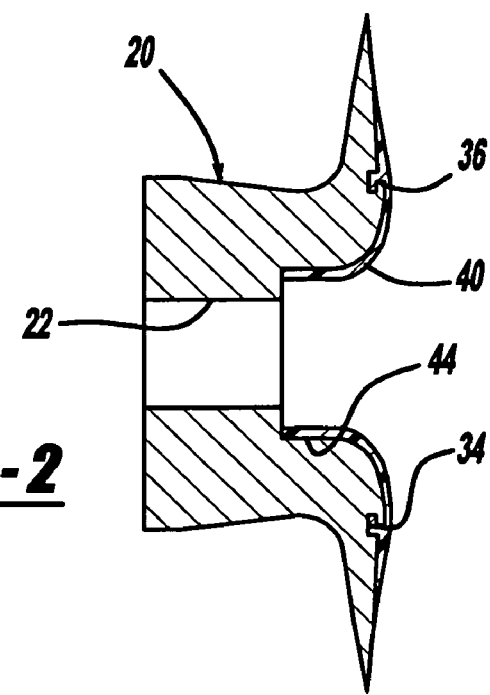
FIG - 1
Prior Art
FIG - 2

MANUFACTURING PROCESS FOR HYDROGEN PRESSURE TANK

BACKGROUND OF THE INVENTION

1. Field of the Invention

This invention relates generally to a manufacturing process for a compressed hydrogen tank and, more particularly, to a manufacturing process for a compressed hydrogen tank that includes injection molding a portion of a liner of the tank to fill a sealing gap in a tank boss and then rotomolding the rest of the liner thereafter.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines.

Typically hydrogen is stored in a compressed gas tank under high pressure on the vehicle to provide the hydrogen necessary for the fuel cell system. The pressure in the compressed tank can be upwards of 700 bar. In one known design, the compressed tank includes an inner plastic liner that provides a gas tight seal for the hydrogen, and an outer carbon fiber composite layer that provides the structural integrity of the tank. Because hydrogen is a very light and diffusive gas, the inner liner and the tank connector components, such as O-rings, must be carefully engineered in order to prevent leaks. The hydrogen is removed from the tank through a pipe. At least one pressure regulator is typically provided that reduces the pressure of the hydrogen within the tank to a pressure suitable for the fuel cell system.

As the hydrogen is removed from the compressed tank, the pressure of the hydrogen in the tank will decrease. When the pressure of a gas is reduced and the volume does not change, the temperature of the gas will also decrease. The effect of the decrease in the temperature will be limited because heat is transferred from the environment into the tank. If the flow rate of the hydrogen flowing out of the tank is high enough and/or the temperature of the environment is low enough, the temperature in the tank can fall below −80° C. Typically it is possible to limit the hydrogen flow rate so that −80° C. is the lowest temperature that occurs within the tank. Further, when the tank is being filled with hydrogen, the temperature of the hydrogen can increase to 80° C. due to the compression of the hydrogen inside of the tank, providing a temperature swing of −80° C. to 80° C. The materials that can seal hydrogen in this temperature range are difficult to produce.

If the temperature of the hydrogen within the tank decreases beyond a certain temperature, such as −80° C. around the liner and −40° C. at the tank seals, including O-rings and other sealings, the materials become brittle and possibly damaged, affecting the tank's gas tight performance. Therefore, there are limits as to how fast hydrogen and/or for how long hydrogen can be removed from the compressed tank in a fuel cell system.

FIG. 1 is a cut-away, cross-sectional view of a known compressed hydrogen storage tank 10 of the type discussed above. The tank 10 includes an outer structural layer 12, typically made of a graphite composite, and an inner liner 14, typically made of a durable plastic, such as a high density polyethylene. The liner 14 provides the gas tight environment for the hydrogen gas, and the outer layer 12 provides the structural integrity for the compressed hydrogen gas. An opening 16 in the outer layer 12 provides a location where hydrogen is removed from the tank 10 and put into the tank 10. An annular neck portion 18 of the liner 14 extends partially into the opening 16. A boss 20 is provided within the opening 16 and is formed around the neck portion 18 between the liner 14 and the outer layer 12. The boss 20 is typically made of metal, such as stainless steel, and has a configuration for a particular tank design.

A bore 22 extending through the boss 16 accepts an in-tank valve block 24. The valve block 24 includes all of the necessary components that are required for the operation of the tank system. An O-ring 30 is provided between the valve block 24 and the boss 20 to provide seal integrity. This configuration of the tank 10 allows the hydrogen to be removed from the tank 10 through line 32 without loss of seal integrity.

The tank 10 is an improvement over known compressed hydrogen tanks that are complicated and require several O-rings. The design of the tank 10 is intended to prevent hydrogen from leaking through the opening 16 and the outer layer 12 at lower pressures. Particularly, the boss 20 includes an annular channel 34 that defines an edge flange 36. The channel 34 maintains a tighter seal between the boss 20 and the liner 14 that helps prevent gas leaks at lower pressures. This design eliminates most of the O-rings in the valve block 24 that were required in conventional compressed hydrogen tanks.

The most cost effective technique for molding the plastic liner 14 is by a rotomolding process, well known to those skilled in the art. In this process, the plastic liner material is applied as a granulate to a mold shaped like the liner 14. The mold is rotated and heated so that the plastic material is evenly distributed on the mold surface to form the liner 14. The boss 20 is positioned in the mold during the rotomolding process so that the plastic liner material is formed around the neck portion 18 of the liner 14, as shown in FIG. 1. Once the boss 20 is formed to the liner 14, the valve block 24 can be threaded to the boss 20 to provide the seal integrity.

The rotomolding process is not conducive for filling small gaps, and therefore the channel 34 may not completely fill with the liner material during the rotomolding process, thus affecting the sealing properties at this location in the tank 10. Therefore, known designs that employ the channel 34 require that the entire liner 14 be injection molded when it is fabricated. However, because of the size of the tank 10 and the time required to injection mold, injection molding the liner 14 is not a cost effective process.

SUMMARY OF THE INVENTION

In accordance with the teachings of the present invention, a process for manufacturing a compressed gas tank is disclosed that includes a combination of an injection molding process and a rotomolding process. In a first step, a boss to be positioned in the opening of an outer structural layer of the tank is provided and a thin portion of a tank liner is injection molded to the boss so that a channel within the boss is filled with the liner material to increase the seal integrity between the boss and the liner. Once the liner material has hardened, the surface of the injection molding liner portion is cleaned. Next, a rotomolding process is performed to mold the remaining portion of the liner. During the rotomolding process, the injection molded portion of the liner is melted to be part of the liner made during the rotomolding process.

Additional features of the present invention will become apparent from the following description and appended claims, taken in conjunction with the accompanying drawings.

BRIEF DESCRIPTION OF THE DRAWINGS

FIG. 1 is a cut-away, cross-sectional view of a known compressed hydrogen gas tank;

FIG. 2 is a cross-sectional view of a boss for a compressed hydrogen tank of the type shown in FIG. 1 including an injection molded portion of a liner, according to a manufacturing process for a compressed hydrogen tank according to the invention;

DETAILED DESCRIPTION OF THE EMBODIMENTS

Figure 3:
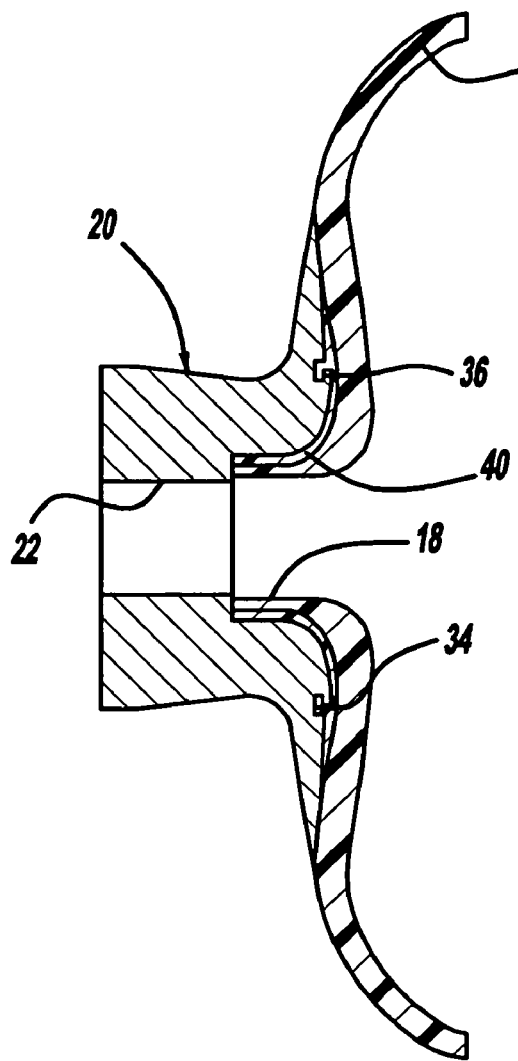
FIG. 3 is a cross-sectional view that shows a next step in the manufacturing process of a compressed hydrogen tank of the invention, including a portion of a rotomolded liner molded to the boss shown in FIG. 2.

The following discussion of the embodiments of the invention directed to a process for manufacturing a compressed hydrogen tank is merely exemplary in nature, and is in no way intended to limit the invention or its applications or uses. Particularly, the process has an application for making a compressed hydrogen tank for storing hydrogen in a fuel cell system. However, as will be appreciated by those skilled in the art, the process has application to produce tanks other than compressed hydrogen tanks.

The following discussion of the invention discloses a process for manufacturing a compressed hydrogen gas tank to better provide seal integrity between a liner of the tank and a boss of the tank of the type discussed above with reference to FIG. 1. The discussion of the invention below uses the same reference numerals for the tank 10 above solely for ease of understanding. Generally, the process includes a two-part step for molding the liner 14 where an injection molding step is used to fill the channel 34 with liner material and a rotomolding process is then used to fabricate the remaining and larger portion of the liner 14.

FIG. 2 is a cross-sectional view of the boss 20 including the channel 34 and the flange 36 that will be part of a compressed hydrogen storage tank of the type discussed above manufactured by a process according to the present invention. The boss 20 is placed within an injection mold to mold a thin layer 40 of the liner material on an inside surface 44 of the boss 20, as shown. Because the injection molding process is used instead of the rotomolding process, the channel 34 is completely filled with the liner material that provides the desired seal integrity at the opening 16, as discussed above. Once the thin layer 40 has hardened, it is then cleaned by a suitable cleaning process, such as etching, to be ready for the rotomolding step.

FIG. 3 is a cross-sectional view of the next step in the manufacturing process of the tank that shows a liner 50 that has been rotomolded over the layer 40.

Figure 4:
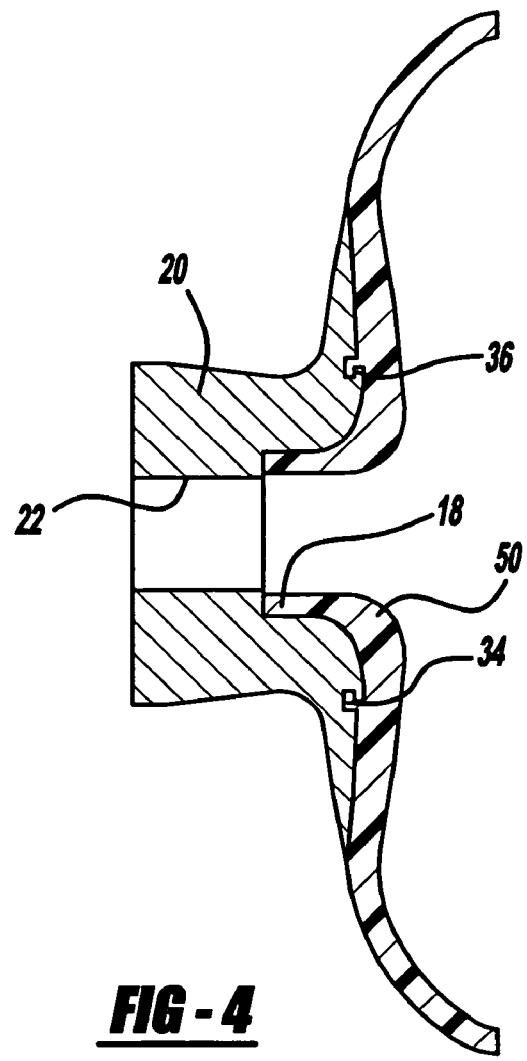
FIG. 4 is a cross-sectional view that shows a next step in the manufacturing process of a compressed hydrogen tank of the invention, where the injection molded portion of a liner and the rotomolded portion of the liner have been fused together as a single liner.

Because of the temperatures involved in the rotomolding process, the layer 40 partially melts during the rotomolding process so that the layer 40 and the liner 50 fuse or weld together as shown in FIG. 4. In this embodiment, the layer 40 and the liner 50 are made of the same plastic material, such as a high density polyethylene. However, in alternate embodiments, the material of the layer 40 and the liner 50 can be made of different moldable materials as long as they will fuss together during the rotomolding process. Once the liner 50 is fabricated, then the structural layer 12 is formed to the liner 50 in the usual manner.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for manufacturing a tank, said method comprising:
    providing a metal boss including a channel;
    injection molding a thin layer of plastic to the boss so that the plastic fills the channel of the boss; and
    rotomolding a gas tight liner to the boss so that the thin layer of injection molded plastic on the boss conforms to and fuses with the liner.

2. The method according to claim 1 wherein providing a boss includes providing a boss that is part of a connector assembly in an opening of the tank.

3. The method according to claim 1 wherein providing a boss includes providing a boss with an annular channel defining a flange.

4. The method according to claim 1 further comprising cleaning an outer surface of the layer before rotomolding the liner.

5. The method according to claim 1 further comprising forming an outer structural layer to the liner.

6. The method according to claim 1 further comprising positioning a valve block within an internal bore of the boss.

7. The method according to claim 1 wherein the layer of plastic and the liner are made of the same material.

8. The method according to claim 7 wherein the layer of plastic and the liner are made of a high density polyethylene.

9. The method according to claim 1 wherein the layer of plastic and the liner are made of different materials.

10. The method according to claim 1 wherein the tank is a compressed hydrogen tank.

11. The method according to claim 10 wherein the hydrogen tank is part of a fuel cell system on a vehicle.

12. A method for manufacturing a compressed hydrogen tank, said method comprising:
    providing a metal boss including an annular channel defining a flange, said boss being part of a connector assembly in an opening of the tank;
    injection molding a thin layer of plastic to the boss so that the plastic fills the channel; and
    rotomolding a gas tight liner to the boss so that the thin layer of injection molded plastic on the boss conforms to and fuses with the liner.

13. The method according to claim 12 further comprising cleaning an outer surface of the layer before rotomolding the liner.

14. The method according to claim 12 further comprising forming an outer structural layer to the liner.

15. The method according to claim 12 further comprising positioning a valve block within an internal bore of the boss.

16. The method according to claim 12 wherein the layer of plastic and the liner are made of the same material.

17. The method according to claim 16 wherein the layer of plastic and the liner are made of a high density polyethylene.

18. The method according to claim 12 wherein the layer of plastic and the liner are made of different materials.

19. A method for manufacturing a tank, said method comprising:
injection molding a thin layer of plastic to a non-plastic structural component of the tank so that the plastic fills a channel in the component; and
rotomolding a gas tight liner to the component so that the material of the thin layer of injection molded plastic conforms to the liner.

* * * * *